S. E. MOSHER.
FILTERING WATER IN HOUSEHOLD AND OTHER CISTERNS.
No. 178,020. Patented May 30, 1876.

Witnesses
E. N. Mick
Joseph Kellhofer

Inventor
Samuel Earl Mosher

N. PETERS, PHOTO-LITHOGRAPHER, WASHINGTON, D. C.

UNITED STATES PATENT OFFICE.

SAMUEL E. MOSHER, OF CHILLICOTHE, OHIO.

IMPROVEMENT IN FILTERING WATER IN HOUSEHOLD AND OTHER CISTERNS.

Specification forming part of Letters Patent No. 178,020, dated May 30, 1876; application filed October 12, 1875.

*To all whom it may concern:*

Be it known that I, SAMUEL EARL MOSHER, of Chillicothe, in the county of Ross, in the State of Ohio, have invented a new and Improved Mode of Filtering Water in Household or other Cisterns; and I do hereby declare that the following is a full and exact description thereof, reference being had to the accompanying drawings, and to the letters of reference thereon.

The nature of my invention consists in a large or small chamber, for holding the filtered water, inclosed by a double wall of brick, and an inclosed space between the two walls for holding the filtering material.

Figure 1:
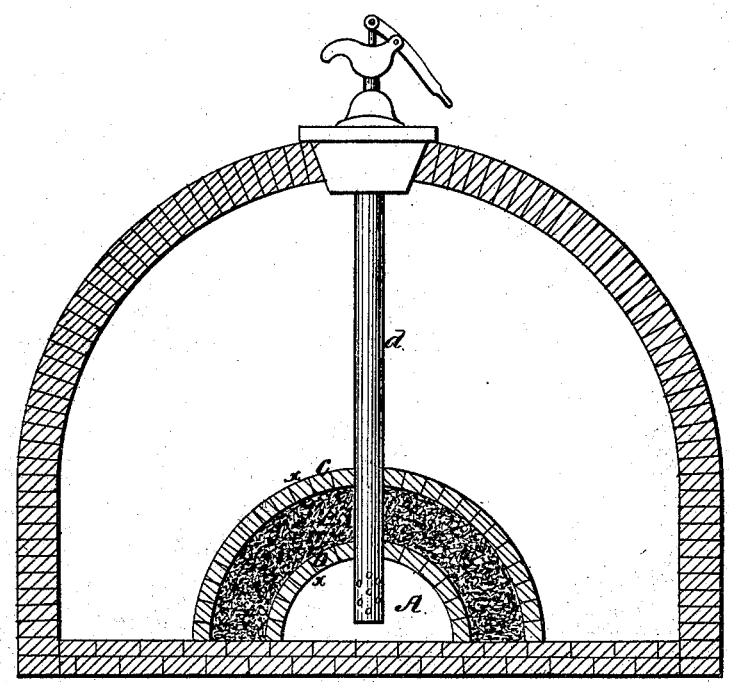
Figure 2:
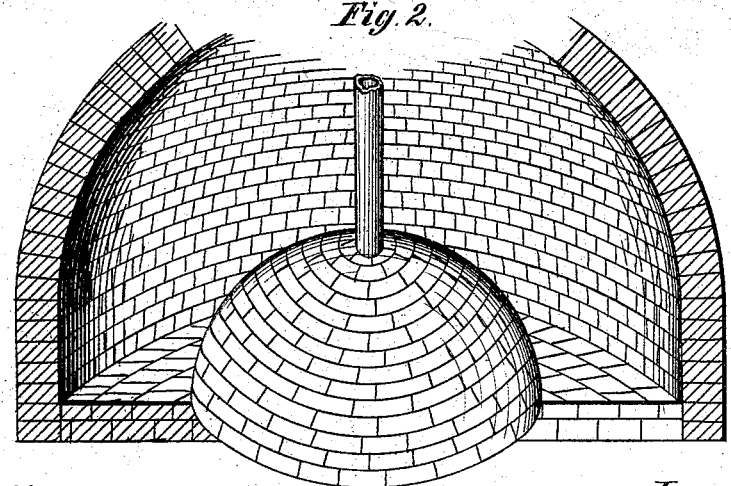

In the drawings, Figure 1 represents a vertical section of the filter; Fig. 2, the filter as completed.

To enable others skilled in the art to make and use my invention, I will now proceed to describe fully its construction and manner of operation.

First. Take iron or lead pipe $d$ (would recommend galvanized gas-pipe) large enough to admit pump-stock, and long enough to reach from under the cover to bottom of cistern, with holes in bottom to admit water. Make it fast to top and bottom of cistern; or said pipe may be substituted by the pipe running direct from pump to the bottom of reservoir.

Second. Take good building-brick, (not too hard;) place them on edge in a circle, or otherwise, about eight inches, more or less, from the bottom of the pipe; lay them up in cement in the shape of a dome, or otherwise, connecting with pipe about eighteen inches, more or less, above the bottom of the cistern, plastering the top of dome firmly to the pipe. This forms the inner wall $b$, Fig. 1, and the chamber A.

Third. Build up a similar wall, $c$, ten inches, more or less, from wall $b$, and parallel to it, until the pipe is reached. The cavity between must be filled with fine charcoal and gravel, or other filtering material, which may be put in during the construction of the outside wall, and, when full, cement firmly to, and plaster six or eight inches around, the pipe, to prevent a possibility of the water getting down through the top without passing through full thickness of charcoal. A flue, built of brick or tiling, may be substituted in place of the pipe $d$ for the convenience of a chain-pump, or larger pipe.

The advantage of this device will be readily perceived. Its location at the bottom of the cistern is out of everybody's way, and where the frost cannot reach it. The wall $c$ acting as a strainer, the filtering material cannot become clogged by smut and other dirt, so that it can always have its full chemical action on the water to purify it, and the sediment on the cone can be easily washed off when the cistern is cleaned.

Having thus fully described my invention, what I claim as new, and desire to secure by Letters Patent, is—

The combination of the charcoal-space, the dome-shaped walls $c$ and $b$, the chamber A, and the pump-tube $d$, all relatively arranged as and for the purposes described.

This specification signed and witnessed this 7th day of September, 1875.

SAMUEL EARL MOSHER.

Witnesses:
E. K. MICK,
JOSEPH KELLHOFER.